3,362,930
COMPOSITION RESISTANT TO OZONE
Henry J. Kehe, Akron, Ohio, assignor to The B. F. Goodrich Company, New York, N.Y., a corporation of New York
No Drawing. Filed Mar. 1, 1966, Ser. No. 530,786
5 Claims. (Cl. 260—45.8)

ABSTRACT OF THE DISCLOSURE 6-anilino-2,2,4-trimethyl-1,2-dihydroquinoline has been found to be an effective protective agent against the effects of ozone. The 6-anilino-2,2,4-trimethyl-1,2-dihydroquinoline is particularly effective as an antiozonant for elastomeric compositions and vulcanizates thereof.

---

This invention relates to the preservation of rubber and elastomers by the prevention of exposure cracking caused by ozone and more particularly it relates to the use of 6-anilino-2,2,4-trimethyl-1,2-dihydroquinoline as an antiozonant for natural and synthetic rubbers and elastomers.

The rubber industry has long been faced with the serious problem of ozone cracking and the protection of vulcanizates of sulfur-vulcanizable rubbers against this exposure cracking or degradation by ozone which is especially serious with respect to the service life of tires. Unfortunately, none of the many commercially available antioxidants and antiozonants are completely satisfactory in protecting against ozone cracking. Therefore, an object of the present invention is to provide elastomeric vulcanizates which are more effectively protected against the deleterious effects of ozone than with presently known compounds.

This and other objects are accomplished by use in rubber and elastomer compounds of 6-anilino-2,2,4-trimethyl-1,2-dihydroquinoline. The protective agent of this invention is conveniently prepared by reacting p-aminodiphenylamine with acetone. Two mols of acetone condense with 1 mol of p-aminodiphenylamine to produce 6-anilino-2,2,4-trimethyl-1,2-dihydroquinoline.

The purified 6-anilino-2,2,4-trimethyl-1,2-dihydroquinoline is a low melting solid. It is not necessary that the 6-anilino-2,2,4-trimethyl-1,2-dihydroquinoline be pure to exhibit its ozone inhibiting effect in rubber. The high-boiling viscous oil which is obtained directly by fractionating the reaction mixture generally needs no further purification and will effectively inhibit ozone attack in elastomers and rubbers.

No special processing is required for mixing the anti-ozone agent of this invention into rubber stocks. It is readily incorporated into the rubber prior to vulcanization by mixing on a rubber mill or in an internal mixer as a Banbury mixer, added to solutions or dispersions of the polymer; added as is, in solvents, in a dispersion; masterbatched with other compounding ingredients and the like as is well known. The agent may be used in rubber compounds with any of the conventional processing aids and oils, fillers, reinforcing agents, extenders, curing agents, accelerators, antioxidants, antiozonants, and the like. It is compatible with known antioxidants and antiozonants, and in combination with certain of these shows synergistic activity.

Antioxidants which may be used in conjunction with 6-anilino-2,2,4-trimethyl-1,2-dihydroquinoline include derivatives or homologs of hydroquinone as the monobenzyl ether of hydroquinone or 2,5-di-tert-butylhydroquinone; substituted phenols as styrenated phenols; disubstituted cresols as 2,6-di-tert-butyl-p-cresol; bisphenols as 2,2'-methylenebis(4-methyl-6-tert-butylphenol) and 4,4'-methylenebis(2,6-di-tert-butylphenol); bisthiophenols as thiobis(di - sec-amylphenol) and 4,4'-thiobis(6-tert-butyl-o-cresol); catechol derivatives as di-o-tolylguanidine salt of dipyrocatechol borate; naphthol derivatives as 1,1'-methylene-bis-2-naphahol; butylated 4,4'-isopropylidenediphenol; aminophenols as N-lauroyl-p-aminophenol; primary polyamines as p,p'-diaminodiphenylmethane; diarylamines as N-phenol-alpha-naphthylamine, N-phenyl-beta-naphthylamine and p-isopropoxydiphenylamine; bisdiarylamines as N,N'-diphenyl-p-phenylenediamine, N,N'-di-beta-naphthyl-p-phenylenediamine; diarylamines as N-phenyl-alpha-naphthylamine and 2,4-diaminotoluene, N,N'-diphenylethylenediamine and N,N'-diphenyl p-phenylenediamine; bisdiarylamines as N-cyclohexyl-N'-phenyl-p-phenylenediamine; alkylated diarylamines as mono-octyl- and dioctyldiphenylamine; mixtures containing alkylated diarylamines as mixtures of octyldiphenylamines and wax; ketone-diarylamine condensation products as diphenylamine-acetone condensation products; dihydroquinolines as 1,2-dihydro-2,2,4-trimethyl-6-phenylquinoline; mixtures of dihydroquinolines and diarylamines as mixtures of polymerized 1,2-dihydro-2,2,4-trimethylquinoline and N,N'-diphenyl-p-phenylenediamine; aldehydes-amine condensation products as aldol-alpha-naphthylamine condensation products; butryaldehyde-aniline condensation products; alkylarylamines as N,N'-diphenyl-ethylenediamine; aldehyde imines as N,N'-disalicylalethylenediamine; alkyl aryl phosphites; dithiocarbamates; thiazyl derivatives; thiuram disulfides; thiodipropionates and the like.

The antiozonant of my invention is useful for the protection of vulcanizable rubbers, natural or synthetic, which are subject to attack by ozone, particularly in the vulcanized state. Vulcanized rubbers and elastomers which are most susceptible to ozone attack and which can be protected in accordance with this invention, usually contain one or more percent olefinic unsaturation; and include homopolymers, copolymers and interpolymers of conjugated dienes, such as polybutadiene, butadiene-styrene, butadiene - acrylonitrile, polyisoprene, polychloroprene, isobutylene-isoprene, butadiene-vinyl pyridine, butadiene-alkyl acrylate ester, butadiene-acrylic acid, butadiene-methacrylic acid, butadiene-ester of methacrylic acid, butadiene-chlorostyrene, butadiene-methyl vinyl ketone, and the like. Such elastomers generally contain more than 50% of a diolefin, usually a conjugated diene containing 4 to 6 carbon atoms copolymerized with one or more other vinylidene compounds containing the $CH_2=C<$ group, that is, containing a terminal methylene group attached by a double bond to a carbon atom. Rubbers such as the polysulfides, silicones and the like, although less sensitive to ozone attack than the diene rubbers, nevertheless show an improved resistance to ozone with my antiozone agent. The invention can also be used in the saturated olefin homopolymers, copolymers and terpolymers, such as ethylene-propylene rubber, ethylene-propylene-diene rubbers, acrylate ester elastomers and the like. The amount of 6-anilino-2,2,4-trimethyl-1,2-dihydroquinoline added to these rubbers and elastomers will vary in the range of about 0.25 part to about 9 parts per hundred parts of the rubber, preferably from about one part to about three parts.

The following example will serve to illustrate the invention more fully.

PREPARATION OF 6-ANILINO-2,2,4-TRIMETHYL-1,2-DIHYDROQUINOLINE

To a reactor equipped with a dropping funnel, a stirrer and a condenser leading to a receiver was added 184 grams (1 mol) of 4-aminodiphenylamine and 8.3 ml. (0.1 mol) of concentrated aqueous hydrochloric acid (density 1.19). The mixture was stirred and heated at about 115–125° C. while 440 ml. of acetone was dropped in at a rate of about 5 ml./min. After about 90 minutes, the addition of acetone was complete and 80 ml. of acetone had reacted. The unreacted acetone was recycled through another 90 minute run with an additional 9 ml. of acetone being consumed. The reaction mixture was then treated with about 60 ml. of a 15% aqueous sodium carbonate solution and transferred to a separatory funnel with two 25 ml. portions of toluene. The aqueous layer was discarded and the organic portion (about 270 grams) was fractionated. The yellowish highly viscous fraction B.P. 170–208° C./.7 mm., weighing 95 grams, was collected. Crystallization of the crude product from benzene gave a pale yellow crystalline material with a melting range 85–87.5° C.

*Analysis.*—Calculated for $C_{18}H_{20}N_2$: Carbon, 81.80%; Hydrogen, 7.58%; Nitrogen, 10.62%. Found: Carbon, 81.66%; Hydrogen, 7.62%; Nitrogen, 10.26%.

Molecular weight determination indicated that the 6-anilino-2,2,4-trimethyl-1,2-dihydroquinoline was present essentially in the monomeric form.

Yields of 90% and greater have been obtained in similar experiments where both the amount of acetone and the reaction time have been increased. A sealed autoclave can be used to insure continuous contact with the acetone. Also, it has been found especially advantageous while operating for the longer reaction periods to lower the reaction temperature to about 95° C. thus insuring an even purer reaction product. In such runs any tendency for the 6-anilino-2,2,4-trimethyl-1,2-dihydroquinoline to polymerize under the reaction conditions is essentially nil and elaborate purification of the reaction product is not required.

The 6-anilino-2,2,4-trimethyl-1,2-dihydroquinoline was tested in a typical oil-extended SBR compound typical of those used in the manufacture of passenger car tires. The recipe used was:

| | Parts by wt. |
|---|---|
| Oil-extended SBR | 125.0 |
| Zinc oxide | 5.0 |
| Stearic acid | 1.0 |
| Carbon black | 63.0 |
| Sulfur | 2.0 |
| N-cyclohexyl-2-benzothiazyl sulfenamide | 0.8 |
| Antiozonant | 3.0 |

The oil-extended SBR used contained 25 phr. aromatic processing oil, had a specific gravity of 0.95, a ML4' at 212° F.=50–65 and the rubber had a bound styrene content of 23.5%.

The evaluation of antiozonant under static conditions alone is not the best indication of their service life in tires and other rubber articles which undergo much flexing. The ozone tests included both static and dynamic outdoor exposure to natural weathering. For these tests, specimens were cut from 6" x 6" x .060–.075" sheets prepared by mill-mixing the ingredients and curing for 60 minutes at 302° F. The outdoor dynamic ozone test consisted of mounting 0.5" x 6" x .075" test specimens on a DeMattia flexing machine at a 45° angle facing south, leaving four inches as the flexing length. A flex rate of about 300 flexures per minute was maintained for 24 hours per day. The samples flexed for more than 5 days were also exposed under static conditions so that a combined cyclic dynamic and static test was involved. The samples left in the machine while not operating were under strain.

On completion of each test the samples were evaluated by examination at 15× magnification with a microscope equipped with a reticle in one eyepiece. The mean crack length and mean crack width of six or more randomly selected cracks was estimated while the sample was held in a strained position comparable to that of the maximum strain during the test run. The product of length times width was determined and designated the "severity of ozone cracking," hereafter abbreviated SOC. The SOC values are directly proportional to the surface area of the open voids of the ozone crack as well as the depth of the ozone crack. Therefore, high SOC values indicate a wide, deep and long crack and represent severe attack by ozone. On the other hand, a low SOC value indicates a resistance to ozone attack.

The antiozonant of my invention and several materials having similar chemical structures, some of which are commercially available, were tested in oil-extended SBR in accordance with the procedure described above. All test samples contained 3.0 parts by weight antiozonant per 100 parts SBR, except for the controls which contained no antiozonant. SOC values were determined at the completion of the test and are set forth in the following tables.

*Table I*

[Outdoor dynamic/static test: Flex time—222 hours; static time—450 hours; means temperature 22° F.]

| Antiozonant: | SOC |
|---|---|
| Control | 21.5 |
| 6-anilino-2,2,4-trimethyl-1,2-dihydroquinoline (crude material obtained from example above) | 2.6 |
| 6-ethoxy-2,2,4-trimethyl-1,2-dihydroquinoline [1] | 4.2 |
| 2,4-diethyl-2-methyl-1,2-dihydroquinoline (monomeric) | 10.5 |
| 2,4-diethyl-2-methyl-1,2-dihydroquinoline (polymeric) | 13.5 |
| 2,2,4-trimethyl-1,2-dihydroquinoline (polymeric) [1] | 13.0 |

[1] A commercial antiozonant.

Other commercial antiozonants were compared with 6-anilino-2,2,4-trimethyl-1,2-dihydroquinoline in a longer test.

*Table II*

[Outdoor dynamic/static test: Flex time—71 days; static time—6 days.]

| Antiozonant: | SOC |
|---|---|
| 6-anilino-2,2,4-trimethyl-1,2-dihydroquinoline | 49.8 |
| N,N'-di(1-methylheptyl)-p-phenylenediamine [1] | 65.9 |
| N-isopropyl-N'-phenyl-p-phenylenediamine [1] | 90.5 |

[1] A commercial antiozonant.

*Table III*

[Outdoor dynamic test]

| Antiozonant | SOC | |
|---|---|---|
| | 11 days | 24 days |
| Control | 58.2 | 111 |
| 6-anilino-2,2,4-trimethyl-1,2-dihydroquinoline | 3.1 | 10.1 |
| 2,2,4-trimethyl-1,2-dihydroquinoline | 28.2 | 75.9 |
| 2,2,4-trimethyl-1,2-dihydroquinoline (polymeric) [1] | 17.2 | 56.8 |

[1] A commercial antiozonant.

Tables I, II and III show that the 6-anilino-2,2,4-trimethyl-1,2-dihydroquinoline of this invention is an effective antiozonant, superior to the antiozone agents which are currently being used by the rubber industry and unexpectedly superior to compounds closely related in structure, and that it can be used in rubber compositions specifically compounded for use in automobile tires, wire coating and any other rubber compound and article exposed to ozone. When the above examples are repeated with nitrile rubber, polybutadiene, natural rubber, polychloroprene and polyolefin elastomers, vulcanizates with excellent resistance to ozone cracking are obtained.

I claim:

1. A composition comprising (A) an elastomer selected from the group consisting of elastomers containing at least one percent olefinic unsaturation and saturated olefin polymers, and (B) 6-anilino-2,2,4-trimethyl-1,2-dihydroquinoline.

2. The composition of claim 1 wherein the elastomer contains at least one percent olefinic unsaturation and the 6-anilino-2,2,4-trimethyl-1,2-dihydroquinoline is present in amount from about 0.25 to 9 parts per hundred parts of elastomer.

3. The composition of claim 2 wherein the elastomer contains more than 50% polymerized conjugated diene and the 6-anilino-2,2,4-trimethyl-1,2-dihydroquinoline is present in amount from about one to three parts per hundred parts of elastomer.

4. A vulcanized composition of claim 2.
5. A vulcanized composition of claim 3.

References Cited

UNITED STATES PATENTS 2,794,020  5/1957  Harris et al. _____ 260—814 X

DONALD E. CZAJA, *Primary Examiner.*

M. J. WELSH, *Assistant Examiner.*